United States Patent [19]

Pease

[11] Patent Number: 4,907,347
[45] Date of Patent: Mar. 13, 1990

[54] SWIVEL HEAD COUNTER

[75] Inventor: Eugene D. Pease, Muskegon, Mich.

[73] Assignee: S & K Products, Inc. A Division of Armstrong International, Muskegon, Mich.

[21] Appl. No.: 300,046

[22] Filed: Jan. 23, 1989

[51] Int. Cl.⁴ ................................................. G01B 5/18
[52] U.S. Cl. ........................................ 33/720; 33/719; 33/713; 43/27.4
[58] Field of Search ................. 33/713, 719, 720, 715; 235/109; 43/26.1, 27.2, 27.4

[56] References Cited

U.S. PATENT DOCUMENTS

| 528,600 | 11/1894 | Kirtland | 33/720 |
| 707,599 | 8/1902 | Krumhoff | 33/720 |
| 1,220,318 | 3/1917 | Campbell | 235/109 |
| 2,685,742 | 8/1954 | Johnson | 33/719 |
| 3,352,017 | 11/1967 | Newbery | 33/719 |
| 3,844,058 | 10/1974 | King | 43/27.4 |
| 3,874,108 | 4/1975 | Connor | 33/720 |
| 4,586,286 | 5/1986 | Cheatham, Jr. | 33/720 |
| 4,644,678 | 2/1987 | Seres | 43/27.4 |

Primary Examiner—William A. Cuchlinski, Jr.
Assistant Examiner—Thomas B. Will
Attorney, Agent, or Firm—Miller, Morriss and Pappas

[57] ABSTRACT

A swivel head counter for accurately measuring line in tension, such as a downrigger line passing over a pulley and the pulley driving a compact gear train. The gear train drives a counter wheel or knob so that actual depth or extension of downrigger line or the like may be directly read out. A swivel adjusts to maintain proper positioning of line to pulley.

5 Claims, 2 Drawing Sheets

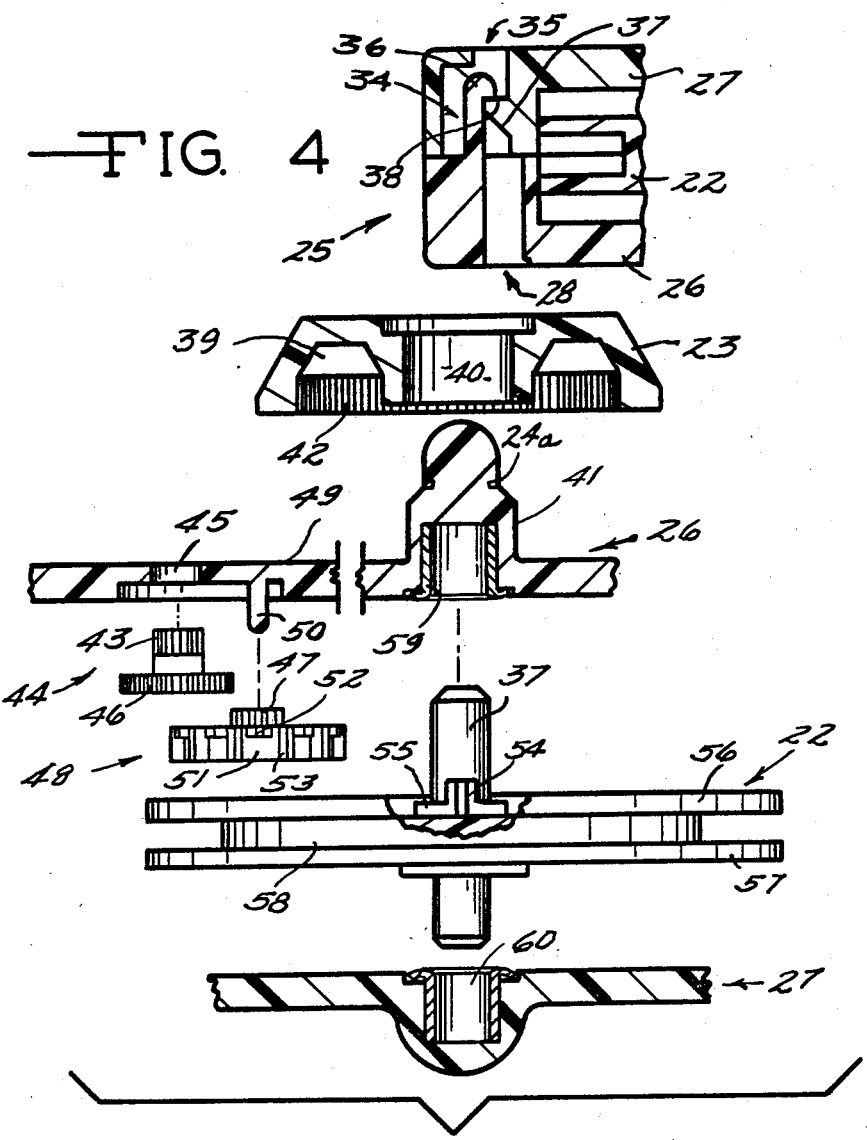
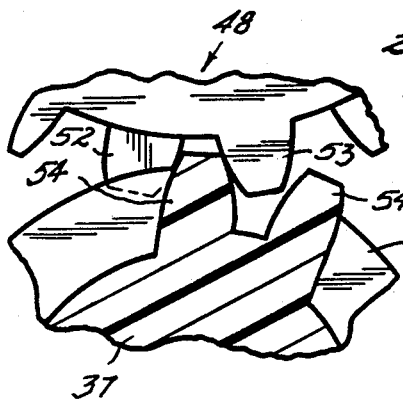

SWIVEL HEAD COUNTER

The present invention relates to a new, useful and unobvious swivel head counter especially designed for use with downriggers as used in fishing or trolling where a cannonball or weight is used to carry a lure line to a particular selected fishing depth. The counter of the present invention, unlike counters of the past which count revolutions of the reel, actually measures line as it is dropped into the water so that the read-out on the dial indicates downrigger line actually passing through the swivel head in lineal measure useful to the fisherman in pin-pointing lure depth more accurately.

Revolution counting means for establishing the fishing depth are neccessarily inaccurate because the spool or reel of line changes diameter on the spool or reel as line is spooled on or off and because even the thickness variations or the diameter variants of downrigger cable or line cause error in estimation. This error is further dramatized by change in line tension on the reel. In the present invention line travelling through the swivel head is measured and the measurements are extremely accurate. The counter is calibrated and the read-out is direct in feet or meters or other selected lineal measure. So far as is known only revolution counters have been used in downrigger fishing and other known indicators for repeating fishing depth were in tying string or ribbon to the cable for repeating a depth location.

A substantial body of thought given to downrigger fishing is directed to placing the lure at the right depth in the water and necessarily the only measure of depth is obtained by a direct measurement of the downrigger or cannonball line. The repetetive accuracy of the swivel head counter of the present invention allows the fisherman to return his rig, and the lure secured to it, to substantially the same level or strata where fish have been or are likely to be encountered. If a fish locating or finding device indicates action at 50 feet the lure can be directly delivered to that depth by adjustment of the downrigger line to that desired setting utilizing the present invention. To provide such a sensitive depth measuring device it is also necessary to maintain a minimum profile for the counter structure so that a read-out scale can be achieved without bulk on the end of the downrigger boom and preferably at the block or pulley over which the line passes. The device must be economical, compact, durable under a wide range of weather conditions and be able to accomodate a turning of the boat by appropriate swivelling in avoidance of binding of the line and, to accommodate accurate adjustment of the cannonball line to boat speed. The presently described unit achieves those objectives.

The swivel head counter is formed substantially completely in resin or plastic materials relatively impervious to rust and weathering and selected for good dimensional stability.

IN THE DRAWINGS:

FIG. 4 is a cross section elevation view taken on the line 4—4 of FIG. 1 and detailing the detent assembly latch construction of the side plates of the swivel head counter.

FIG. 5 is an exploded cross section elevation view of the swivel head counter and showing the simple assembly of the internally geared counter cap, the side plates comprising a housing for journalling the shaft extensions of the pulley, and accommodating the pulley, and the compact meshed gearing elements.

FIG. 6 is a partial cross section plan view through the shaft or axle of the pulley and the integral pair of spur gear teeth radially projecting from the shaft perimeter and indicating the relation to the gear teeth intermediate the spur gear and to final driving of the internal ring gear formed in the counting cap or knob element.

FIG. 6A is an enlarged partial plan view of FIG. 6 and indicates the positive engagement of one of the spur gear teeth as between the gapped gear teeth in the intermediate two tiered gear element.

FIG. 6B is of the same elements seen in FIG. 6A in partial plan view and indicating the teeth of the spur gear disengaged from the spaced teeth of the intermediate gear and retained by the hub shoulder portion of the spur gear poised for positive pick up in the next revolution and securing the intermediate gearing element from rotation until the engagement by the pair of spur gear teeth.

SPECIFIC DESCRIPTION

Figure 1:
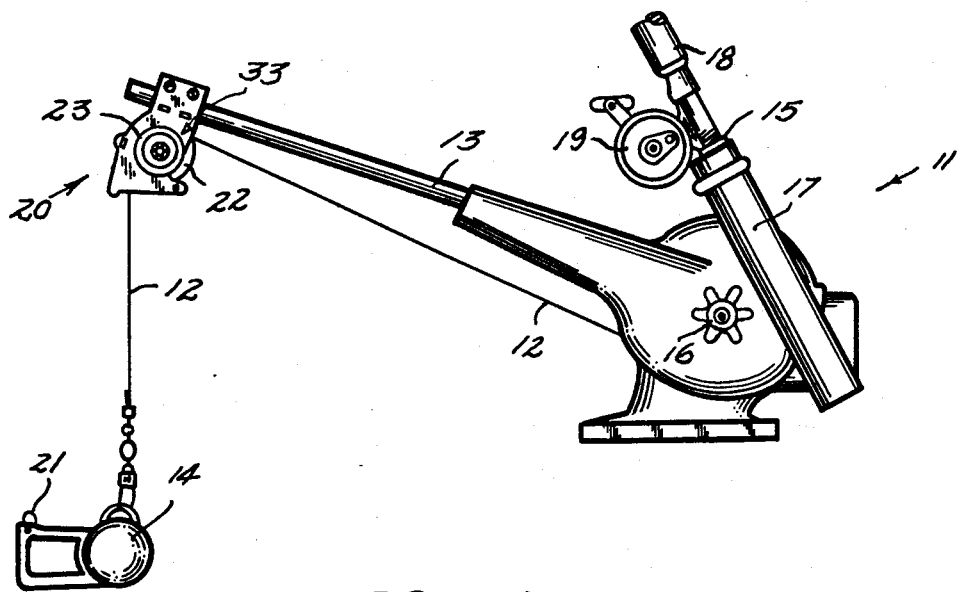
FIG. 1 is a side elevation view of a swivel head counter in accord with the present invention on a downrigger structure at the end of a boom extension with the drop line or cannonball line in position to be lowered and the line or cable attached to the weight or cannonball.

Referring to the drawing and with first reference to the FIG. 1, thereof, a typical downrigger unit 11 for carrying the cable or line 12 is shown. The downrigger 11 usually is rigged to run outboard of a fishing boat via a boom extension 13 to a motion translating device which is in the form of a pulley 22. The downrigger line 12 is operably installed over the pulley 22 and the line 12 is then terminally connected to a downrigger weight or cannonball 14. The downrigger 11, as shown, includes a projecting boom 13 and a rod holder 17. The rod holder 17 is shown supporting a fishing rod 18 which may provide a pocket for the handle 15 of a fishing reel 19. The downrigger 11 operably supports a spool or reel (not shown) of downrigger line 12 and the spool is rotated on the axis of the clutch lock or brake handle 16 wholly independent of the fishing line contained on the fishing reel 19. The swivel head counter 20 of the present invention provides an anti-friction transition support for the line 12 and is slung under the boom 13 so as to swivel on the axis of the boom 13. This accomodates turning of the towing or trolling vessel behind which the cannonball or weight 14 trails. As will be understood by downrigger fishermen the fishing or lure line (not shown) runs from the rod 18 to the weight 14 where it is detachably connected as at the ring 21. When the weight 14 is lowered by the downrigger 11 on the downrigger line 12 it carries with it the lure line and the bait or lure streams out behind the weight 14 as the vessel (not shown) moves through the water in a direction generally left to right in the FIG. 1. In such trolling of the fishing line the amount of line 12 extended by the downrigger 11 generally determines the running depth of the lure. This depth, as will be seen, is measured by movement of the line 12 over the pulley 22 as compactly geared to a selected and calibrated readout on the indicator knob 23. Dependent upon the speed of the boat or vessel on which the downrigger 11 is mounted, an angle deviating from the vertical occurs in line 12.

When a strike occurs, as when a fish grabs the lure as trailed, then the fishing line pulls free of the cannonball or weight 14 providing the fisherman with all of the pleasures, then, of free line fishing. At that point the depth is noted on the indicator knob 23 and the weight 14 is retrieved by the downrigger 11 avoiding interference with the lure line, then engaged with a fish, and the weight 14 may be raised to the boom 13, or trailed at or near the water surface until the fish is landed or until the lure is reattached to the weight 14 and the downrigger line 12 is reextended into the water. Knowing the angle and/or water speed and the amount of extended downrigger line the lure can be repositioned in the strata where the fishing was indicated or at the depth suggested by fish or depth locating equipment by merely reading the proper lineal extension on the indicator 23 as the weight 14 is lowered and achieving the proper speed of the vessel or angle of deviation from the vertical in the line 12 between the cannonball 14 and swivel head counter 20. That angle will be the angle noted at the time of the strike and reflecting the boat speed.

Figure 2:
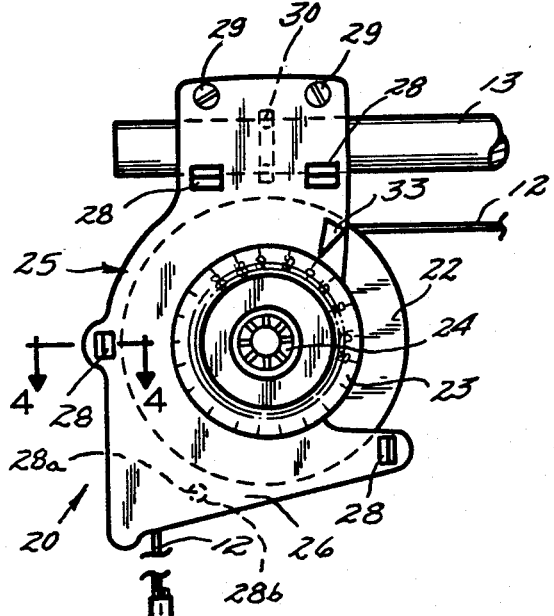
FIG. 2 is a side elevation view of the swivel head counter of the present invention secured to the boom of a downrigger and depending therefrom with the drop line cable trained over the swivel head counter pulley wheel and the line extending to connection with the downrigger weight.
Figure 3:
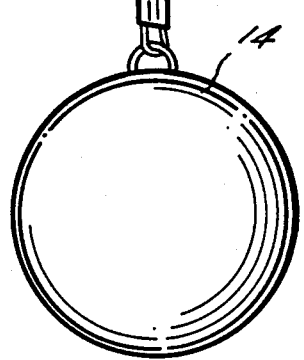
FIG. 3 is a rear elevation view of the swivel head counter with the counter pulley visible as for rigging.

In FIGS. 2 and 3 the construction of the swivel head counter 20 can be better understood. The plastic housing 25 operably supports the pulley 22 on the axis of the indicator knob 23 and the housing 25 (by reference to FIG. 3) is in two parts or side plates 26 and 27 secured registrably together by the detent means 28 and by the fasteners 29, the latter assuring a keyed pivitol connection between the grooved portion 30a to the grooved portion 30 of the boom 13. The slightly hemispheric extension 31 on the axis of the indicator knob 23 is a protuberance of the precision injection molded plastic housing part 26 and the indicator knob 23 is rotatably journalled on the extension 31. As will be seen movement of the knob 23 is by gearing moved only by the rotation of pulley 22. The line clearance slot 32 across the bottom of the swivel head counter 20 is clearly visible allowing free movement of the line 12 over the pulley 22 with minimal line contact with the housing 25. The swivelling function of the swivel head counter 20 prevents the line 12 from climbing the flanges of the pulley 22 and the line 12 remains in the running groove or the pulley 22.

The indicator pointer 33 is visible on the housing part or plate 26 adjacent the indicator knob or wheel 23. The pointer 33 is also visible in the FIGS. 2 and 1.

Phantom lines on the FIG. 3 through the axis of the boom opening 33a indicate the swivelling deflection capability of the unit 20 as occurs in turning of the vessel or unusual situations where the weight 14 may encounter the ocean, lake or river bottom or local obstructions.

In the FIG. 4 the partial section view through the portion of the housing 25 at one of the detent connectors 28 illustrates the interlock of male and female detent elements 34 and 35, respectively, so that as the housing parts 26 and 27 are closed against each other the hook-like male extension 36 enters the pocket of the female element 35, is deflected outwardly by the ramp 37 engaging the head of the hook-like portion of the male extension 36 and then locks securely on the buttress or latch face 38 of the female element 35. Plural detent connectors 28 function simultaneously to close the housing 25 and are assisted by locating pins such as 28a and receiving recess 28b (FIG. 2) to assure excellent alignment and registry of the housing side plate parts 26 and 27 in reference to the pulley 22 and compact gearing as will be seen. Disconnect after locking is difficult in prevention of casual tampering but special tooling operating simultaneously on the male extension, 36 can dislodge the elements 36 permitting disassembly of the swivel head counter 20. The mode of interlock as described using the detent means 28 discourages tampering with the internal mechanism.

In the exploded section view of FIG. 5 the operational contents of the housing 25 formed by the registering parts 26 and 27 in relationship to the pulley 22 and the indicator knob or wheel 23 will be best understood and the understanding of the very compact gearing (die cast plastic elements) will be assisted.

The counter knob or wheel 23 is coaxial with the axle 37 of the pulley 22 and operably connected over the protuberance of the housing part 26 having the rounded or hemispheric end 31. The ring groove 24a in the protuberance of the housing part 26 accommodates the push-on-ring 24 preventing axial displacement of the knob or wheel 23 while allowing freedom of rotation as previously described. The general disc shape of the knob 23 is appreciated in FIGS. 2 and 3 but in the FIG. 5 the hollow interior 39 of the knob 23 is coaxial about the axial through opening 40 sized to a running fit over the protuberance shoulder portion 41 of housing element 26. The knob element 23 is injection molded and precision formed from tough, weather resistant and dimensional stable filled plastic resin material requiring only the removal of flashing where necessary. The outer perimeter of the interior 39 of the knob 23 includes an injection molded precision formed internal ring gear 42 and the ring gear 42 is sized and positioned to operably engage the spur gear 43 portion of the compound gear element 44. The spur gear portion 43 extends through the opening 45 in the housing element 26 to drive the contact with the ring gear 42. The larger gear portion 46 of the compound gear 44 is nested in the wall of the housing element 26 surrounding the opening 45 and on the inside of the complete housing 25 as earlier described. The gear portion 46, then, is driven by the spur gear portion 47 of the compound stepped gear element 48, also precision formed in plastic as by injection molding and gear element 48 is axially journalled on the pin 50 depending from the wall 49 of housing member 26. The larger stepped gear portion 51 of the compound gear element 48 as shown is provided with an inner short complete set of gear teeth 52 and gapped alternate elongate teeth 53. The tooth arrangement of teeth 52 and 53 permits, with the pair of radially extending spur gear teeth 54 injection molded and integral with the axle portion 37 of the pulley 22, a plural reduction with rotation of the pulley 22 as will be seen. As will also be seen a spanning function by the cylindrical shoulder 55 as between teeth prevents any movement of the gearing as described unless by movement of the pulley 22, thereby eliminating any possibility of external movement of the indicator knob or wheel 23. The pulley 22 will be seen as flanged to retain the downrigger line 12 running between the flanges 56 and 57 and over the integral cylindrical body 58. By adjusting the diameter of the cylindrical body 58 to the described gearing excellent calibration of the counter indicator knob 23 can be achieved. The integral axle 37 extends outwardly on both sides of the pulley 22 for running fit in metallic bushings 59 and 60 in the housing elements 26 and 27, respectively. The bushings are preferably bronze or stainless steel (thin wall) and having the internal thrust carrying flanges as shown. The consequent operation is smooth and relatively free of any unusual friction and is very reliable in wildly variant thermal and moisture environments.

By reference to the FIG. 6 the gear train reduction can be best appreciated commencing with movement of the pulley 22 on its integral shaft or axles 37 and from which a single pair of radially disposed teeth 54 extend to mesh with spaced apart broadly gapped teeth so that an entire rotation of the pulley 22 is required to move the compound gear 48 through one tooth of motion. The balance of the gearing through spur 47 to compound gear 44 and its spur 43 and to ring gear 42 driving the indicator knob or wheel 23 is straight-forward and the sizing of the gearing is calibrated conveniently through 100 feet of rotational movement of the pulley 22 and measured at the interface of cable or line 12 with the cylindrical surface 58 of the pulley.

By reference to the FIG. 6A the function of the spur gear teeth 54 (one pair only) on the axle 37 can reach and operate to move one tooth 53 (meshed between teeth 52 and 53 in a single revolution of the axle 37. In the interim while rotation proceeds the cylindrical shoulder 55 spans and blocks any rotation of the compound gear 48, the span occurring when shoulder 55 is interposed between adjacent elongate teeth 53. In FIG. 6B the spanning by shoulder 55 is seen as the teeth 54 of the pulley 22 on axle 37 release their moving influence on the teeth 53. The very desireable consequence is to fully prevent any manual or accidental attempts to rotate the knob 23 except as the pulley 22 drives the structure. In addition, the compactness of construction allows for a complete geared measurement function within the narrow confines of the housing 25.

Having thus described the invention and a preferred embodiment of it including the very substantially improved means of providing lineal movement measurement means with weather resistant construction especially for downrigger environment, other improvements, modifications and changes may from time to time occur to those ordinarily skilled in the art and such improvements, modifications and changes are intended to be included limited only by the spirit of the appended claims.

I claim:

1. A swivel head counter comprising:
   a pair of side plates operably confining therebetween a gear train, a pulley, including an axle extension portion of said pulley having a radially slotted spur protuberance, sleeve bearings supporting said axles in said plates, a swivel sleeve and key way providing a symetrical, cylindrical enclosure with an axis transverse to the axis of said axle, said side plates including locator pins and pin receiving recesses, and plural detent means cooperating upon registering closure of said side plates to securely lock said sideplates in operative relation in respect to said gear set, said pulley and said swivel portion;
   a wheel knob counter calibrated externally in convenient lineal distance intervals and having an internal circular gear engageable with said gear train extending operably through one of said side plates and said knob operably connected to an axle-like extension of said one of said side plates and said counter secured to said extension in prevention of axial displacement; and
   a pointer on said one of said side plates functioning together with said wheel knob counter as a counting indicator of lineal movement of said pulley, whereby counting from 0, a line passing from the swivel head counter is determinable in lineal units to determine an actual depth and upon retrieval of the line returning said counter to 0.

2. In the combination of claim 1 wherein said side plates, said gear train, said pulley, said wheel knob counter are all injection molded precision parts from tough dimensionally stable and weather resistant plastic material.

3. A swivel head counter secureable to an end of a boom in a downrigger fishing structure over which the downrigger cannon ball line is trained and providing a direct depth read-out comprising;
   a pair of registering cavity forming side plates having complementing and registering detent means;
   a pulley supportable by said pair of side plates in a journalled operable relation, said pulley having tooth and stop means;
   a gear train supported operably in between said plates and providing a calibrated reduction meshed operably with said tooth structure of said pulley;
   a calibrated knob rotatably supported externally on one of said side plates and rotated by an extension of said gear train operably engaged with an internal circular gear;
   a cylindrical swivel pocket formed upon closure of said side plates and closing upon said boom;
   a keeper means preventing axial removal of said knob from said one of said side plates; and
   a pointer means integral with said side plates commencing with a zero indicator position indexed to said knob calibrations.

4. A swivel head counter comprising:
   a pair of interlocking and registering side plates defining a pulley cavity, journalling, a swivel cavity, and detent means in said plates; and
   a pulley with axle means and an integral radially extending spur gear tooth extending radially therefrom and said pulley supported in said journalling;
   gear means supported within said pulley cavity of said side plates and operably engaged with said spur gear tooth and one of the rotatable extensions of said gear means extending through one of said side plates;
   a calibrated rotating knob having an internal ring gear engaging said gear means extending through said one of said side plates and said knob in rotatable support upon an extension of said one of said side plates and fixed thereupon against axial removal; and
   a pointer-indicator fixed to said of said side plates and referenced to said calibrated knob.

5. A direct read-out swivel head counter comprising:
   a driving means having a single split tooth spur gear and a shank portion, said tooth extending radially from said shank;
   a two-tiered gear the upper tier comprising a plurality of teeth having an interval therebetween into which said cylindrical shank of said split tooth spur gear extends to block movement of said two-tiered gear and the lower tier of said two-teared gear having a tooth midway between said teeth in said upper tier and radially coextensive with said teeth in said upper tier and said two-tiered gear including a coaxially extending smaller spur gear portion;

a compound gear offset from said two-tiered gear and engaged operably with said spur gear portion of said two-tiered gear on one side and said compound gear having a smaller diameter portion extending coaxially from said first mentioned portion of said compound gear and engaged operably with an internal ring gear of a rotating knob;

a first support structure for said split toothed spur gear, said gears and said rotating knob and including detent means and locating means and a swivel support section; and a second support structure in registry with said first support means including detent means registering with said first mentioned detent means and registering locating means forming, upon closure with said first support means and together with said first support defining a gear cavity and further defining slotted ingress and egress to line means driving said driving means;

a swivel cavity in said swivel support section having an axis transverse to the axis of said gears and offset from said gears; and said support structures having journal means securing said gears, driving means and knob in operative engagement.

* * * * *